Aug. 16, 1966 J. PIENING ETAL 3,267,440

CIRCUIT ARRANGEMENT FOR READING DIGITAL SIGNALS

Filed Aug. 6, 1962

3,267,440
CIRCUIT ARRANGEMENT FOR READING DIGITAL SIGNALS

Jens Piening and Horst Girke, Munich, Germany, assignors to Siemens & Halske Aktiengesellschaft, Berlin and Munich, Germany, a corporation of Germany
Filed Aug. 6, 1962, Ser. No. 215,064
Claims priority, application Germany, Sept. 1, 1961, S 75,542
4 Claims. (Cl. 340—174)

Figure 1:
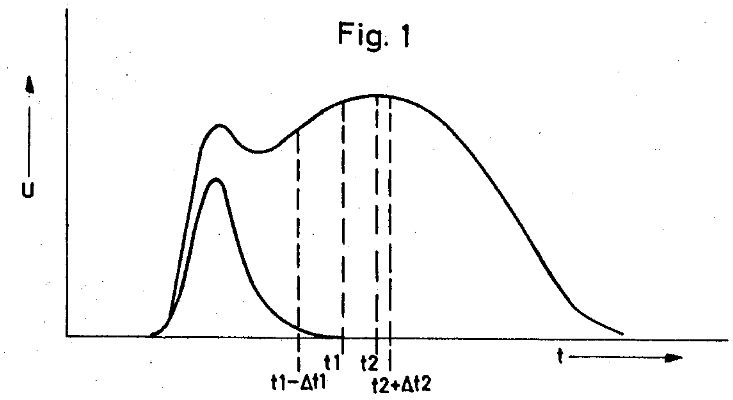

The invention disclosed herein is concerned with a circuit arrangement for the reading of digital signals.

The feeding of digital signals into a data processing system requires circuit arrangements which are responsive to a command adapted to select from digital signals present on a plurality of lines, one or more signals and to extend such signal or signals to the input of the data processing system. The readout of such input signals is generally effected with the aid of coincidence gates which are in the case of a large number of lines, in consideration of a triggering control expenditure as low as possible, suitably arranged in the form of a matrix. Such coincidence gates may comprise resistors and directional conductors or diodes or magnetic cores with rectangular hysteresis loop.

The advantage of coincidence gates constructed of magnetic cores resides, in addition to small expenditure and great reliability, in providing an electrical separation between the sources of the digital signals and the data processing system. It is moreover possible to achieve a far reaching matching with respect to the available input current, by the selection of the number of turns of those windings to which the signals are extended. Each magnetic core of such matrix has a premagnetization winding, an input winding, a row and a column winding. The premagnetization is so adjusted that the magnetic core can be demagnetized only when in the input, the row and the column windings, a current occurs simultaneously. The induction alteration appearing upon change of magnetization of a magnetic core results in a voltage surge which can be taken off with the aid of an auxiliary output wire which is linked with all magnetic cores.

Upon reading out a magnetic core, there may occur a disturbance of the voltage induced in the reading wire in the event that the input field strength of any other magnetic core of the matrix arrangement should change during the time when this voltage is being tested. This is always possible in the case of asynchronous operation of exterior signal sources and readout circuit. Since the hysteresis loop has also for the field strength $|H|>Hc$ a rising slope $db/dH \pm 0$, the magnetic cores themselves have even in strongly premagnetized condition an inductivity $L>0$. When the input field strength of a magnetic core changes, for example, owing to the closure of a signal switch, the voltage surge appearing thereby will in the first instant be transmitted to the output wire in the ratio of the number of turns and will thereafter decay with the time constant determined by the series resistance and the noted inductivity. This effect, which does not occur in a customary storage matrix arrangement, can upon readout of an information unit "One" simulate a "Zero" and vice versa.

It would be possible, in order to reduce these disturbances, to connect an auxiliary inductance ahead of the winding for producing the input field strength. This would result in a division of the maximum of the interference voltage appearing in the output wire. However, the flux alteration of the magnetic core, caused by the switching in of the input current, and therewith the entire voltage-time-area of the interference voltage, would not change. This measure accordingly does not offer a reliable protection against a plurality of voltage surges occurring and adding up within a brief time interval. An integration of the voltage registered upon the reading wire has the same drawback. Owing to the small voltage-time-area of such a disturbing voltage surge, as compared with that which occurs upon readout of an information unit "One," such measure would in given situations cause a suppression of a single interference voltage surge, but would not be effective in the presence of summation of a plurality of voltage surges.

As compared with these possibilities for the elimination of the interference voltage, the invention proceeds from the recognition of the fact that there is between the interference pulses and the information pulses a considerable difference with respect to the time course of the voltages.

Details of the invention will appear from the description which is rendered below with reference to the accompanying drawing.

Figure 2:
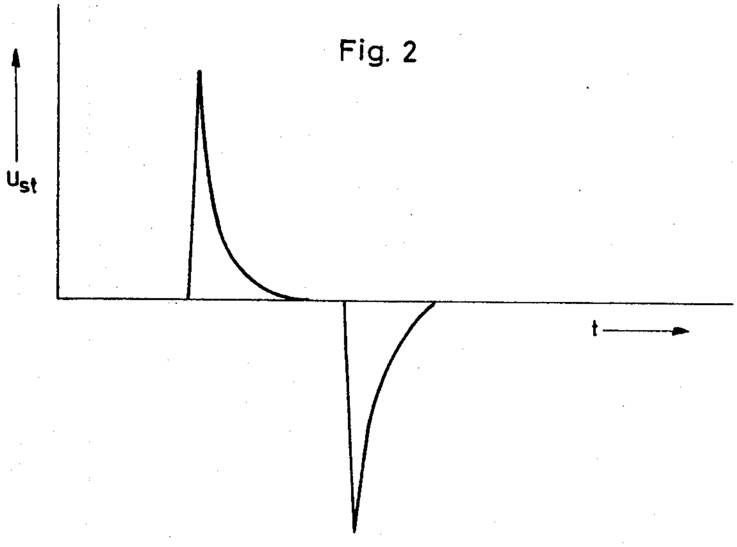
Figure 3:
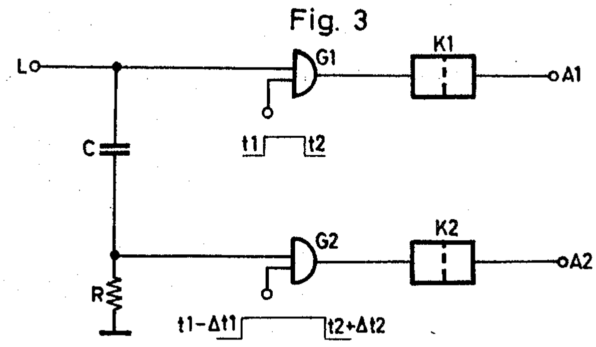

FIG. 1 shows in principle the time course of the undisturbed voltage which is induced in the output wire of a magnet core matrix arrangement;

FIG. 2 indicates interference pulses occurring owing to changes of the input field strength in one magnetic core while another magnetic core is being read; and FIG. 3 represents details of the circuit arrangement according to the invention.

Referring now to FIG. 1, the upper curve shows the course of the voltage of the reading signal in the presence of an input field strength in the magnet core, while the lower curve shows the voltage course in the absence of an input field strength. Between the time $t1$ and $t2$ is in known manner conducted a test or checking as to whether or not there is an input field strength in the magnetic core which is being read. Both curves have in this time interval $t1$ to $t2$, in undisturbed condition, a given rising slope. However, in the event that the input field strength of another magnetic core is changed during the time of reading a magnetic core, interference pulses will occur which are indicated in FIG. 2.

These interference pulses are superposed upon the information pulses and the resulting course of the curve of the voltage on the reading wire assumes in the interval $t1$ to $t2$ a slope which deviates from the course of the curve of the undisturbed signal.

The invention utilizes this situation and connects with the output winding of the matrix arrangement a differentiating circuit which triggers a serially disposed bistable flip flop circuit whenever the absolute value of the rising slope of the curve course of the reading signal exceeds a given value.

Upon applying the invention, the voltage induced in the output wire incident to the reading of a magnetic core, will be tested with respect to two properties. First, it will be established whether the voltage is caused by the presence of an information unit "One" or an information unit "Zero." The voltage is in addition examined as to possibly present interference pulse portions. In case of ascertaining an interference pulse, the further extension of the ascertained information unit "One" or "Zero," respectively, is prevented and a renewed reading is effected.

The circuit arrangement according to the invention, as shown in FIG. 3, comprises substantially an "And" switching gate G1, one input of which is connected with the reading wire L and the output of which is connected with a flip flop stage K1. To the second input of the gate G1 is during the time interval $t1$ to $t2$ supplied a voltage which makes the gate conductive for the signal which is to be evaluated. Switching arrangements comprising two elements of this kind, namely, an "And" circuit and a flip flop stage are frequently used in connection with magnetic storers.

In the circuit arrangement according to the invention, there is also provided a differentiating circuit which is connected with the reading wire L, comprising a capacitor C and a resistor R. The effect of this differentiating circuit is, that the serially connected flip flop stage K2 is operatively triggered whenever the absolute value of the rising slope of the curve of the reading signal exceeds a given value in the time interval $t1-\Delta t1$ to $t2+\Delta t2$.

At the output A1 of the illustrated circuit can be obtained a signal which signifies whether the read information unit is "One" or "Zero." At the output A2 can be obtained a signal which appears in the presence of disturbance of the voltage induced in the reading wire L. This signal at the output A2 can be utilized, for example, for the repetition of the reading of the magnetic core involved.

Since the interval between the time $t1$ and the time $t2$ is, as compared with the average spacing of the changes in the input field strength, generally short, a repetition of the reading will seldom occur and if occuring, will with great probability supply a final result. It is for this reason also possible to provide for a plurality of matrix arrangements a common circuit for the recognition of interference pulses.

The circuit arrangement according to the invention will normally respond to the relatively steep rising flanks of interference pulses that might be present. It may happen, however, that the operative actuation of one or more switches for changing the input currents, takes place shortly prior to the instant $t1$, and that only a part of the drop of an interference pulse appears during the time $t>t1$. In order to also recognize such interference pulses, the differentiating member must be dimensioned so as to make a reliable differentiation possible between the change in time of the undisturbed voltage and the change in time of the interference voltage, and that there is between the instant $t1$ and the instant $t2$ a sufficient spacing for the evaluation between the amplitude of a "One" voltage and the amplitude of a "Zero" voltage, even when these voltages are falsified by interference pulses which just fail to effect a repetition of the reading. This spacing can be increased by beginning with the checking for interference pulses of the voltage induced in the output wire not at the instant $t1$ but already at the instant $t1-\Delta t1$. It is also advantageous to extend the checking for interference voltages up to an instant $t2+\Delta t2$.

In the circuit arrangement shown in FIG. 3, there is for this purpose provided an "And" circuit G2, between the differentiating member comprising the capacitor C and the resistor R and the flip flop circuit K2, having an input which is connected with the differentiating member and an input to which is conducted a control voltage in the time interval from $t1-\Delta t1$ to $t2+\Delta t2$.

Changes may be made within the scope and spirit of the appended claims which define what is believed to be new and desired to have protected by Letters Patent.

We claim:

1. A circuit arrangement for recognizing disturbances in the reading signal of magnetic core matrices which are used for reading out digital signals supplied statically thereto at any time, comprising a differentiating circuit connected with the output winding of the matrix, and a bistable flip-flop circuit operatively connected with said differentiating circuit, means for triggering said flip-flop circuit during a rising portion of the curve of the reading signal, said means being operatively responsive to an output of said differentiating circuit when the rising slope of the curve of the reading signal exceeds a predetermined value.

2. A circuit arrangement according to claim 1, wherein a repetition of the reading is effected depending on the operating condition of said bistable flip-flop circuit.

3. A circuit arrangement according to claim 2, wherein the checking of the reading signal, which is sampled for a definite time interval, for disturbances, is initiated a given time prior to said time interval and continued a given time after such time interval.

4. A circuit arrangement for the recognition of disturbances according to claim 3, which is common to a plurality of magnet core matrices.

References Cited by the Examiner

UNITED STATES PATENTS

| | | | |
|---|---|---|---|
| 2,909,675 | 10/1959 | Edson | 307—88.5 |
| 2,929,940 | 3/1960 | Jones | 307—88.5 |
| 3,034,107 | 5/1962 | Knowles | 340—174 |
| 3,066,231 | 11/1962 | Slobodzinski et al. | 328—206 X |

BERNARD KONICK, *Primary Examiner.*

IRVING L. SRAGOW, *Examiner.*

S. M. URYNOWICZ, *Assistant Examiner.*